(12) United States Patent
Chae et al.

(10) Patent No.: US 11,314,986 B2
(45) Date of Patent: Apr. 26, 2022

(54) LEARNING DEVICE, CLASSIFICATION DEVICE, LEARNING METHOD, CLASSIFICATION METHOD, LEARNING PROGRAM, AND CLASSIFICATION PROGRAM

(71) Applicant: Rakuten Group, Inc., Tokyo (JP)

(72) Inventors: Yeongnam Chae, Setagaya-ku (JP); Kobagapu Bhaskar Rao, Setagaya-ku (JP)

(73) Assignee: RAKUTEN GROUP, INC., Tokyo (JP)

( * ) Notice: Subject to any disclaimer, the term of this patent is extended or adjusted under 35 U.S.C. 154(b) by 0 days.

(21) Appl. No.: 16/635,578

(22) PCT Filed: May 31, 2019

(86) PCT No.: PCT/JP2019/021678
§ 371 (c)(1),
(2) Date: Jan. 31, 2020

(87) PCT Pub. No.: WO2020/240808
PCT Pub. Date: Dec. 3, 2020

(65) Prior Publication Data
US 2021/0406600 A1    Dec. 30, 2021

(51) Int. Cl.
*G06K 9/62* (2022.01)
*G06T 7/73* (2017.01)
*G06V 10/40* (2022.01)

(52) U.S. Cl.
CPC .......... *G06K 9/6257* (2013.01); *G06K 9/628* (2013.01); *G06K 9/6232* (2013.01); *G06T 7/73* (2017.01);
(Continued)

(58) Field of Classification Search
CPC ...... G06K 9/6257; G06K 9/46; G06K 9/6232; G06K 9/628; G06T 7/73; G06T 2207/2008; G06T 2207/30242
(Continued)

(56) References Cited

U.S. PATENT DOCUMENTS

2019/0072977 A1* 3/2019 Jeon ..................... G06K 9/3241
2020/0364509 A1* 11/2020 Weinzaepfel ............ G06N 3/08
2021/0004589 A1* 1/2021 Turkelson ............ G06K 9/6273

OTHER PUBLICATIONS

International Search Report and Written Opinion dated Aug. 13, 2019 for PCT/JP2019/021678 filed on May 31, 2019, 4 pages.
(Continued)

*Primary Examiner* — Michael R Neff
(74) *Attorney, Agent, or Firm* — Xsensus LLP

(57) ABSTRACT

For each of a plurality of images, a learning device acquires first training data including an image, a class of each of one or more objects shown in the image, and the number of objects, from a storage. The learning device trains a feature extraction part, a class estimation part, and an object number estimation part using the first training data. For each of images of which the number is smaller than the plurality of images, the learning device acquires second training data including an image and coordinates of each of one or more objects in the image, from the storage. The learning device causes the trained feature extraction part to output a feature map of the image included in the second training data, and trains a coordinate estimation part using the feature map and the coordinates included in the second training data.

18 Claims, 9 Drawing Sheets

(52) U.S. Cl.
CPC .... G06V 10/40 (2022.01); *G06T 2207/20081* (2013.01); *G06T 2207/20084* (2013.01); *G06T 2207/30242* (2013.01)

(58) Field of Classification Search
USPC .......................................................... 382/103
See application file for complete search history.

(56) References Cited

OTHER PUBLICATIONS

Padmanabhan, S., "Convolutional Neural Networks for Image Classification and Captioning," 8 pages, searched Jul. 9, 2018, URL: https://web.stanford.edu/class/cs231a/prev_projects_2016/example_paper.pdf,cited in the specification of the application.

* cited by examiner

FIG.6
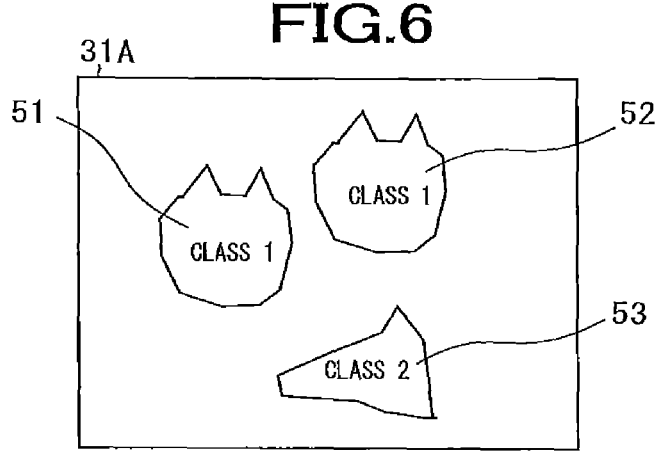
CLASS 1
NUMBER OF OBJECTS: 2
CLASS 2
NUMBER OF OBJECTS: 1
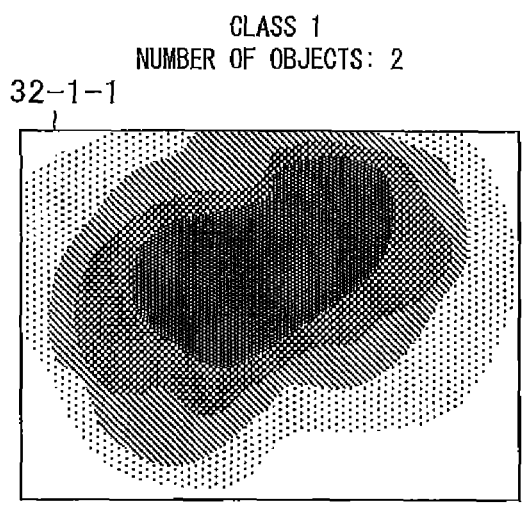
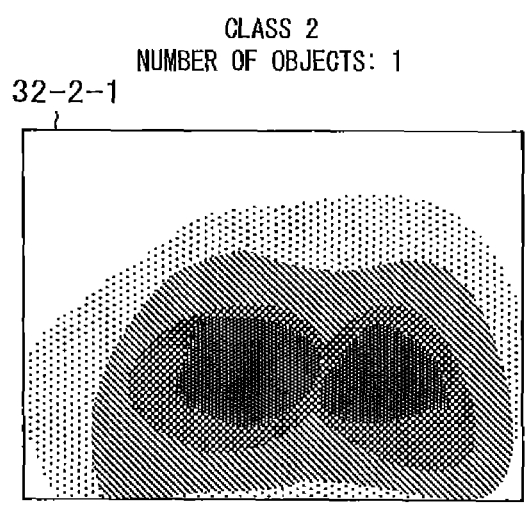
LEARNING COMPLETED ↓
LEARNING COMPLETED ↓
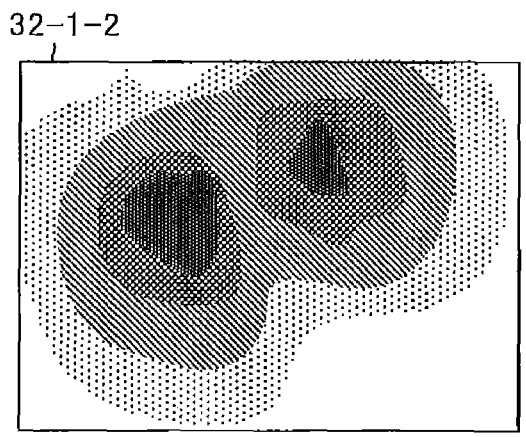
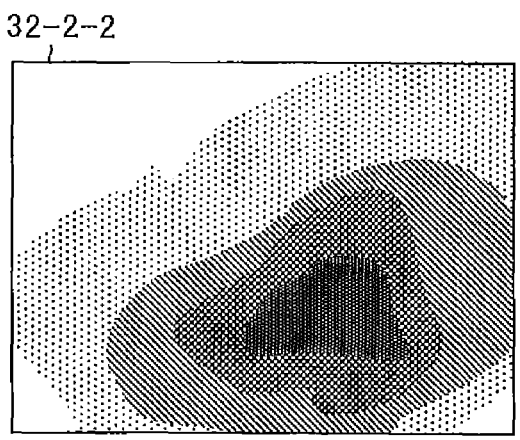

LEARNING DEVICE, CLASSIFICATION DEVICE, LEARNING METHOD, CLASSIFICATION METHOD, LEARNING PROGRAM, AND CLASSIFICATION PROGRAM

CROSS-REFERENCE TO RELATED APPLICATION

The present application is based on PCT filing PCT/JP2019/021678, filed May 31, 2019, the entire contents of which are incorporated herein by reference.

TECHNICAL FIELD

The present invention relates to an image processing method using machine learning, and more particularly to a technical field of a learning method and a classification method for estimating what object is shown and at which position the object is shown in an image using a convolutional neural network.

BACKGROUND ART

Currently, research and development relating to deep learning is actively conducted. Particularly in the technical field of computer vision, convolutional neural networks are generally employed as models for processing an image. This network has a plurality of convolution layers, and repeats a convolution operation on an image to generate a feature map of the image. From this feature map, classification or the like of an object shown in the image is performed (for example, Non Patent Literature 1).

CITATION LIST

Non Patent Literature

Non Patent Literature 1: Sachin Padmanabhan, "Convolutional Neural Networks for Image Classification and Captioning", [online], [searched Jul. 9, 2018], Internet <URL: https://web.stanford.edu/class/cs231a/prev_projects_2016/example_paper.pdf>

SUMMARY OF INVENTION

Technical Problem

Incidentally, in order to generate a model for estimating a class of an object shown in an image and the coordinates of the object in the image, it is necessary to prepare a large amount of data sets that each include an image, a label indicating a class of an object, and a label indicating the coordinates of the object for learning. However, since the coordinates of the object are basically input manually, it is difficult to prepare a large amount of coordinate data. In particular, when a plurality of objects are shown in an image, it is more difficult to prepare coordinate data.

The present invention has been made in view of the above points, and one example of the object is to provide a learning device, a classification device, a learning method, a classification method, a learning program, and a classification program which can generate a model for improving an accuracy of estimating coordinates of a plurality of objects in an image even if only a relatively small amount of coordinate data is used for learning.

Solution to Problem

In order to solve the above problem, an aspect of the present invention is a learning device comprising: a generation means that generates a model including a feature extraction part that includes a plurality of convolution layers and outputs a feature map of an image in which one or more objects are shown, a class estimation part that outputs class information indicating a class of the one or more objects based on the feature map, an object number estimation part that outputs a number of the one or more objects based on the feature map, and a coordinate estimation part that outputs coordinates of each of the one or more objects in the image based on the feature map; and a storage control means that stores the generated model in a model storage means, wherein the generation means includes a first acquisition means that acquires, for each of a plurality of images in each of which one or more objects are shown, first training data including the image, a class of each of the one or more objects, and a number of the objects, from a training data storage means, a first training means that trains the feature extraction part, the class estimation part, and the object number estimation part using the first training data acquired by the first acquisition means, a second acquisition means that acquires, for each of images of which a number is smaller than a number of the plurality of images, second training data including the image, and coordinates of each of the one or more objects in the image, from the training data storage means, and a second training means that causes the feature extraction part trained by the first training means to output a feature map of the image included in the acquired second training data, and trains the coordinate estimation part using the feature map and the coordinates included in the acquired second training data.

According to this aspect, the learning device causes the feature extraction part to output the feature map by a convolution operation on an image by the plurality of convolution layers included in the feature extraction part. Each element in the feature map indicates the probability that an object is shown at the coordinates corresponding to the element in the image. The learning device trains the feature extraction part, the class estimation part, and the object number estimation part so that the class estimation part and the object number estimation part respectively output the class and the number of objects as the labels included in the first training data. As a result of this training, the feature extraction part outputs a feature map in which a number of regions, which correspond to the number of objects included in the first training data and correspond to the position where the object of the class included in the first training data is shown in the image, are highlighted. Since it is sufficient that the coordinate estimation part learns to specify the coordinates of each of one or more objects shown in the image from such a feature map, the learning is easy. Therefore, it is sufficient that the learning device trains the coordinate estimation part using the coordinate data of only the images of which the number is smaller than the images included in the first training data. Therefore, even if only a relatively small amount of coordinate data is used for learning, it is possible to improve an accuracy of estimating the coordinates of a plurality of objects in the image.

Another aspect of the present invention is the learning device, wherein the coordinate estimation part includes a fully connected layer that outputs a threshold value estimated to be a value of a boundary portion between a region where the object is present and a region where the object is not present in the feature map, and an output part that outputs coordinates corresponding to a region composed of elements having a value equal to or greater than the output threshold value, among a plurality of elements constituting the feature map, as coordinates of the object, and the second training means causes the fully connected layer included in the coordinate estimation part to learn the threshold value.

According to this aspect, the fully connected layer included in the coordinate estimation part learns the threshold value for specifying the periphery of the region where the object is present, from the feature map of which each element indicates the probability that the object is present. Therefore, it is possible to appropriately estimate the coordinates of the object.

Yet another aspect of the present invention is the learning device, wherein the first training means trains the feature extraction part by back-propagating errors from the object number estimation part to the feature extraction part so that a number of regions corresponding to the number of the objects included in the first training data are highlighted in the feature map.

According to this aspect, based on a difference between the number of objects output from the object number estimation part and the number of objects included in the first training data, errors from the object number estimation part are back-propagated to the feature extraction part and the parameter of the convolution layer included in the feature extraction part is updated. Therefore, as a result of this training, the feature extraction part outputs a feature map in which a number of regions, which correspond to the number of objects included in the first training data, are highlighted. Therefore, it is possible to accurately estimate the coordinates of each of one or more objects shown in the image.

Yet another aspect of the present invention is the learning device, wherein the object number estimation part outputs the number of the objects for each class, the feature extraction part outputs the feature map for each class, the second training means trains the coordinate estimation part using a feature map corresponding to each of the one or more classes included in the acquired first training data, among feature maps output from the feature extraction part.

According to this aspect, as a result of the training using the first training data, the feature extraction part outputs a feature map in which an appropriate number of regions are highlighted for each of the one or more classes included in the first training data. It is possible to train the coordinate estimation part by using such a feature map so that the coordinates of an appropriate number of objects are output for each class.

Yet another aspect of the present invention is the learning device, wherein the object number estimation part includes a fully connected layer that outputs the number of the one or more objects.

Yet another aspect of the present invention is a classification device comprising: a reading means that reads, from a storage means that stores the model generated by the learning device, the model; a feature map output control means that causes the feature extraction part included in the read model to output a feature map of a given image in which one or more objects are shown; a class output control means that inputs the output feature map of the given image to the class estimation part included in the read model, and causes the class estimation part to output class information indicating a class of each of the one or more objects shown in the given image; and a coordinate output control means that inputs the output feature map of the given image to the coordinate estimation part included in the read model, and causes the coordinate estimation part to output coordinates of each of the one or more objects shown in the given image.

According to the invention, the feature extraction part outputs a feature map in which a number of regions, which correspond to the number of one or more objects shown in the given image and correspond to the position where the object is shown in the image, are highlighted. The class estimation part estimates the class of each of one or more objects shown in the given image from such a feature map. In addition, the coordinate estimation part estimates the coordinates of each of one or more objects shown in the given image from such a feature map. Therefore, even if only a relatively small amount of coordinate data is used for learning, it is possible to improve an accuracy of estimating coordinates of a plurality of objects in the image.

Yet another aspect of the present invention is a learning method to be performed by a computer, the method comprising: a generation step of generating a model including a feature extraction part that includes a plurality of convolution layers and outputs a feature map of an image in which one or more objects are shown, a class estimation part that outputs class information indicating a class of the one or more objects based on the feature map, an object number estimation part that outputs a number of the one or more objects based on the feature map, and a coordinate estimation part that outputs coordinates of each of the one or more objects in the image based on the feature map; and a storage control step of storing the generated model in a model storage means, wherein the generation step includes a first acquisition step of acquiring, for each of a plurality of images in each of which one or more objects are shown, first training data including the image, a class of each of the one or more objects, and a number of the objects, from a training data storage means, a first training step of training the feature extraction part, the class estimation part, and the object number estimation part using the first training data acquired in the first acquisition step, a second acquisition step of acquiring, for each of images of which a number is smaller than a number of the plurality of images, second training data including the image, and coordinates of each of the one or more objects in the image, from the training data storage means, and a second training step of causing the feature extraction part trained in the first training step to output a feature map of the image included in the acquired second training data, and training the coordinate estimation part using the feature map and the coordinates included in the acquired second training data.

Yet another aspect of the present invention is a classification method to be performed by a computer, the method comprising: a reading step of reading, from a storage means that stores the model generated by the learning device, the model; a feature map output control step of causing the feature extraction part included in the read model to output a feature map of a given image in which one or more objects are shown; a class output control step of inputting the output feature map of the given image to the class estimation part included in the read model, and causing the class estimation part to output class information indicating a class of each of the one or more objects shown in the given image; and a coordinate output control step of inputting the output feature map of the given image to the coordinate estimation part included in the read model, and causing the coordinate estimation part to output coordinates of each of the one or more objects shown in the given image.

Yet another aspect of the present invention is a learning program executed by a computer, the program causing the computer to function as: a generation means that generates a model including a feature extraction part that includes a plurality of convolution layers and outputs a feature map of an image in which one or more objects are shown, a class estimation part that outputs class information indicating a class of the one or more objects based on the feature map, an object number estimation part that outputs a number of the one or more objects based on the feature map, and a coordinate estimation part that outputs coordinates of each of the one or more objects in the image based on the feature map; and a storage control means that stores the generated model in a model storage means, wherein the generation means includes a first acquisition means that acquires, for each of a plurality of images in each of which one or more objects are shown, first training data including the image, a class of each of the one or more objects, and a number of the objects, from a training data storage means, a first training means that trains the feature extraction part, the class estimation part, and the object number estimation part using the first training data acquired by the first acquisition means, a second acquisition means that acquires, for each of images of which a number is smaller than a number of the plurality of images, second training data including the image, and coordinates of each of the one or more objects in the image, from the training data storage means, and a second training means that causes the feature extraction part trained by the first training means to output a feature map of the image included in the acquired second training data, and trains the coordinate estimation part using the feature map and the coordinates included in the acquired second training data.

Yet another aspect of the present invention is a classification program for causing a computer to function as: a reading means that reads, from a storage means that stores the model generated by the learning device, the model; a feature map output control means that causes the feature extraction part included in the read model to output a feature map of a given image in which one or more objects are shown; a class output control means that inputs the output feature map of the given image to the class estimation part included in the read model, and causes the class estimation part to output class information indicating a class of each of the one or more objects shown in the given image; and a coordinate output control means that inputs the output feature map of the given image to the coordinate estimation part included in the read model, and causes the coordinate estimation part to output coordinates of each of the one or more objects shown in the given image.

Advantageous Effects of Invention

According to the present invention, even if only a relatively small amount of coordinate data is used for learning, it is possible to improve an accuracy of estimating coordinates of a plurality of objects in the image.

BRIEF DESCRIPTION OF DRAWINGS

FIG. 6 is a diagram illustrating an example of an image used for learning, and probability distributions in feature maps in a stage of learning and after completion of learning.

DESCRIPTION OF EMBODIMENTS

Hereinafter, embodiments of the present invention will be described in detail with reference to the drawings. The embodiments described below are embodiments in a case where the present invention is applied to an image processing device which executes learning for generating a model which is for classifying objects shown in an image and estimating the coordinates of the objects, and performs classification of objects and estimation of the coordinates (that is, object detection). Note that, a device for executing learning and a device for estimating a class and coordinates may be separate devices.

[1. Configuration of Image Processing Device]

Figure 1:
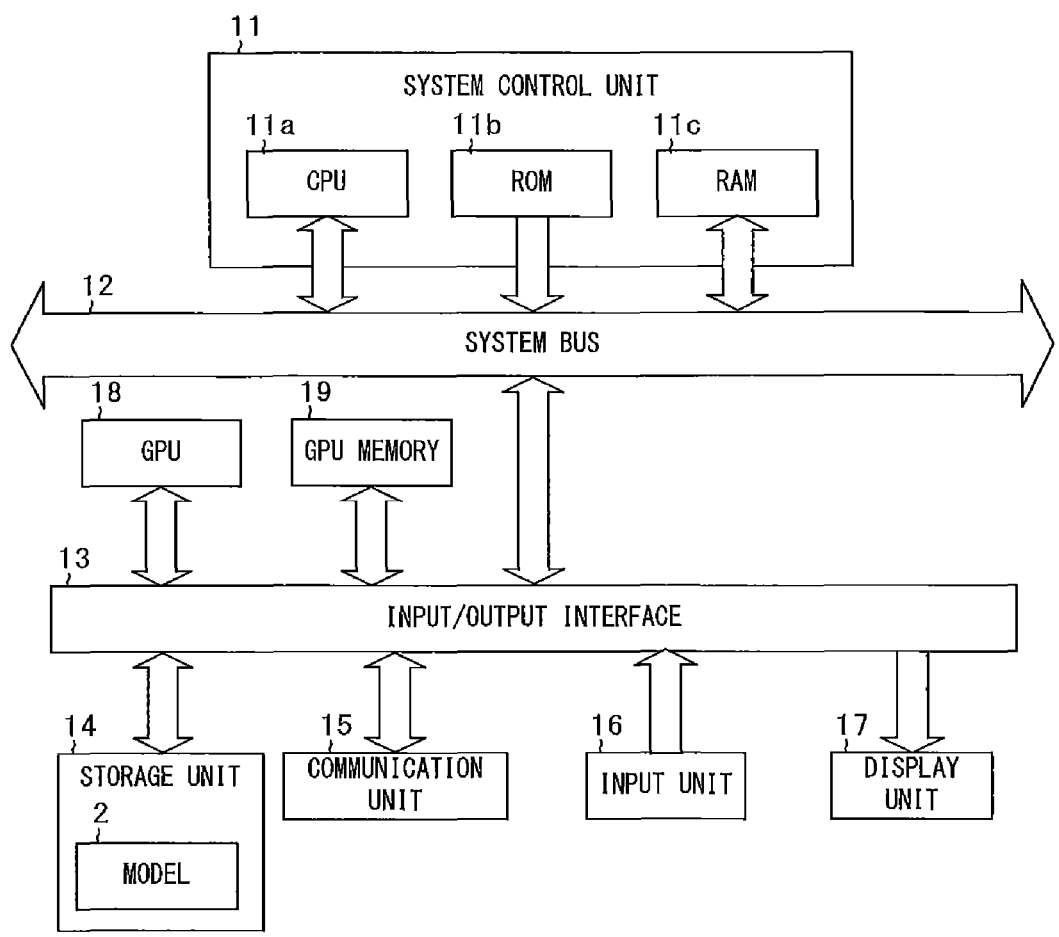
FIG. 1 is a block diagram showing an example of a schematic configuration of an image processing device 1 according to an embodiment.

First, the configuration of an image processing device 1 will be described using FIG. 1. FIG. 1 is a block diagram showing an example of a schematic configuration of the image processing device 1 according to the embodiment. As shown in FIG. 1, the image processing device 1 includes a system controller 11, a system bus 12, an input/output interface 13, a storage unit 14, a communication unit 15, an input unit 16, a display unit 17, a graphics processing unit (GPU) 18, and a GPU memory 19 (or video RAM). The system controller 11 and the input/output interface 13 are connected via the system bus 12. The image processing device 1 may be, for example, a server device or a personal computer.

The system controller 11 includes a central processing unit (CPU) 11a, a read only memory (ROM) 11b, a random access memory (RAM) 11c, and the like.

The input/output interface 13 performs interface processing between the system controller 11 and the storage unit 14 to the GPU memory 19.

The storage unit 14 is configured by, for example, a hard disk drive, a solid-state drive or the like. The storage unit 14 stores a generated model 2, a plurality of pieces of training data used for generating the model 2, and the like. The storage unit 14 further stores an operating system, a model generation program, a classification program, and the like. For example, the training data and various programs may be acquired from a predetermined computer via a network, or may be recorded in a recording medium such as an optical disk, a memory card, a magnetic tape, or the like and read via a drive device. In a case where the device for generating the model 2 and the device for performing classification are separate devices, the transfer of the generated model 2 may be performed via a network or a recording medium.

The communication unit 15 is configured by, for example, a network interface controller or the like. The communication unit 15 is connected to another computer via a predetermined network such as the Internet or a local area network (LAN), and controls a communication state with the computer.

The input unit 16 receives an operation by an operator and outputs a signal corresponding to the operation contents to the system controller 11. Examples of the input unit 16 include a keyboard, a mouse, a touch panel, and the like.

The display unit 17 includes, for example, a graphic controller, a display, and the like. The display unit 17 displays information such as images and characters under the control of the system controller 11. Examples of display panels include liquid crystal panels, organic light emitting (EL) panels, and the like.

The GPU 18 executes a matrix operation or the like in machine learning under the control of the system controller 11. The GPU 18 performs pipeline processing for a plurality of operations in parallel. The GPU 18 and the GPU memory 19 are connected. The GPU memory 19 stores data used for calculation by the GPU 18 and calculation results.

[2. Overview of Functions of System Controller of Image Processing Device]

Figure 2:
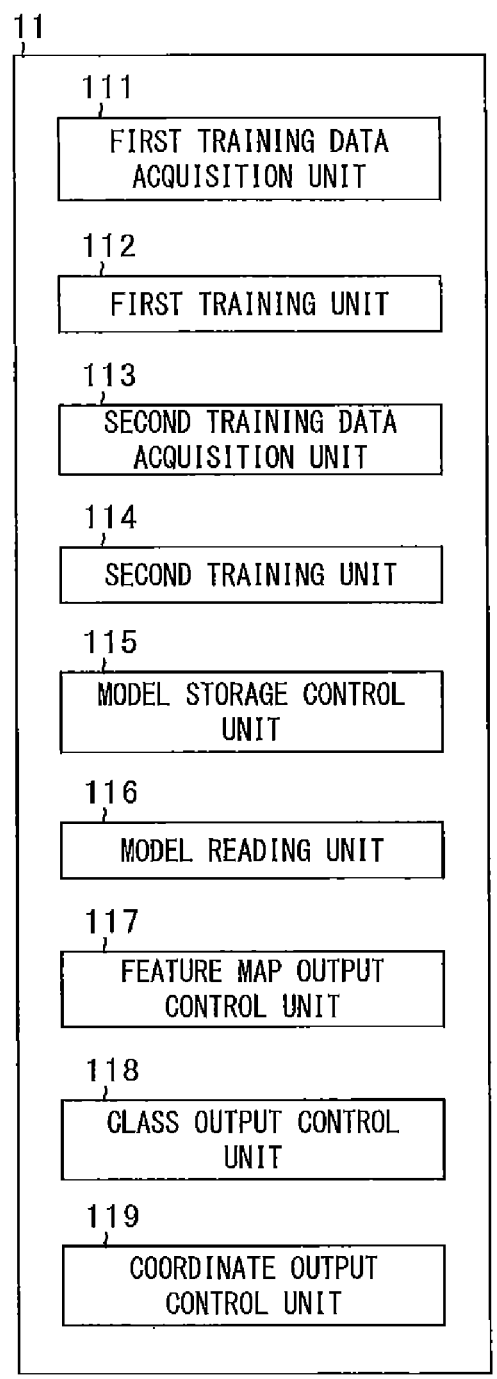
FIG. 2 is a diagram showing an example of functional blocks of a system controller 11 and a GPU 18 of the image processing device 1 according to an embodiment.

Next, an overview of functions of the system controller 11 and the GPU 18 will be described using FIGS. 2 to 7. FIG. 2 is a diagram showing an example of functional blocks of the system controller 11 and the GPU 18 of the image processing device 1 according to the embodiment. By the CPU 11a reading and executing various codes or the like included in the program stored in the storage unit 14, as shown in FIG. 2, the system controller 11 and the GPU 18 function as a first training data acquisition unit 111, a first training unit 112, a second training data acquisition unit 113, a second training unit 114, a model storage control unit 115, a model reading unit 116, a feature map output control unit 117, a class output control unit 118, a coordinate output control unit 119, and the like.

[2-1. Model Generation]

Figure 3:
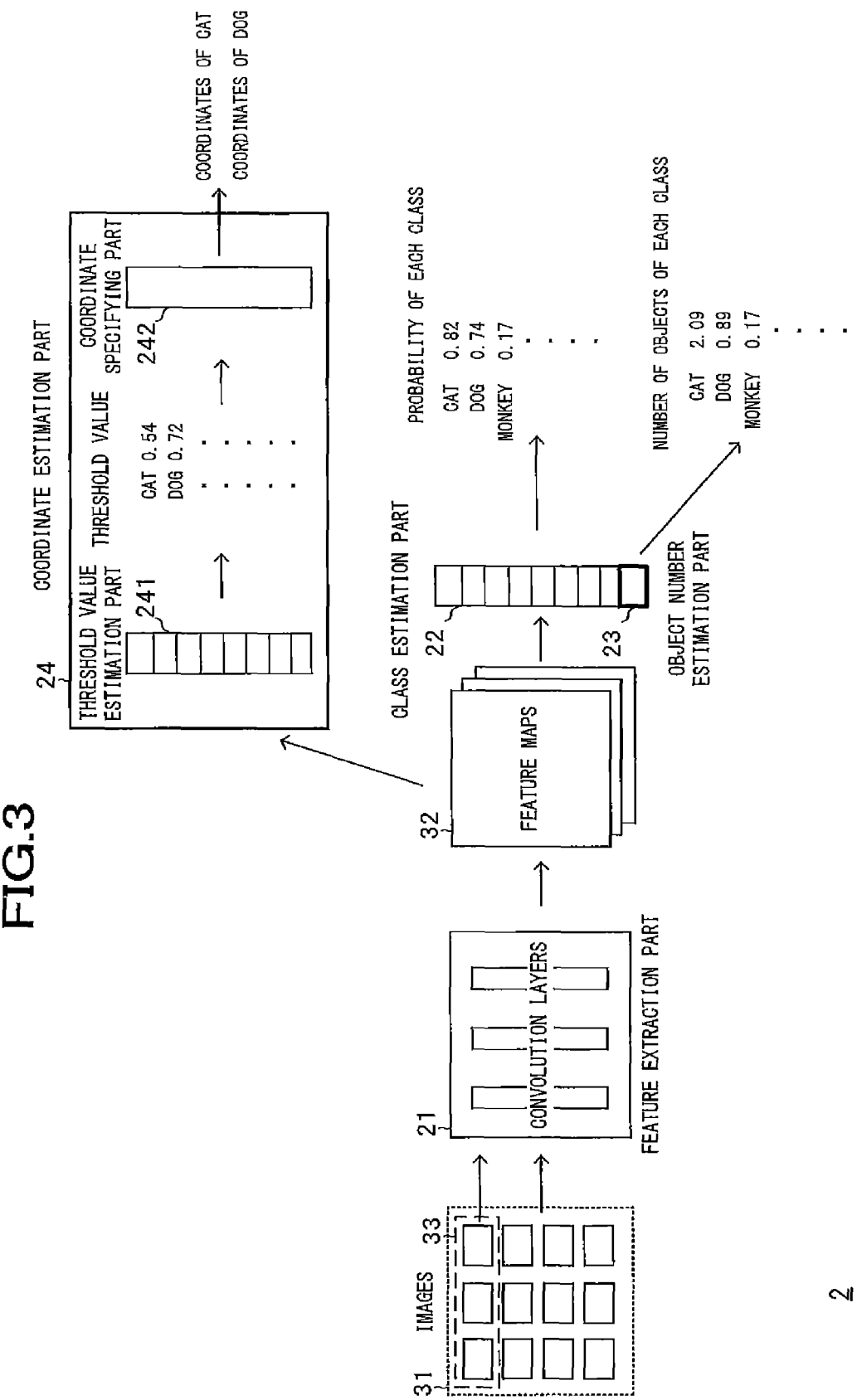
FIG. 3 is a diagram illustrating a configuration example of a model 2.

FIG. 3 is a diagram illustrating a configuration example of the model 2. The first training data acquisition unit 111, the first training unit 112, the second training data acquisition unit 113, and the second training unit 114 generate the model 2 by machine learning. As shown in FIG. 3, the model 2 is a convolutional neural network including a feature extraction part 21, a class estimation part 22, an object number estimation part 23, and a coordinate estimation part 24. Examples of network models on which the model 2 is based include ResNet, GoogleNet, AlexNet, and VGGNet.

The feature extraction part 21 includes a plurality of convolution layers. The feature extraction part 21 outputs feature maps 32 of an image 31 input to the model 2. One or more objects are shown in the image 31. In a case Where a plurality of objects are shown in the image 31, classes of the objects may be the same as or different from each other. The image 31 is, for example, an image prepared by an operator or an image acquired via a network. The feature extraction part 21 repeats a convolution operation for the image 31 using the convolution layers, and outputs the feature map 32 for each class that the model 2 can classify. The feature extraction part 21 may appropriately include layers such as pooling layers.

The class estimation part 22 outputs class information indicating the class of one or more objects shown in the image 31 based on the feature maps 32 output from the feature extraction part 21. The class estimation part 22 includes one or more fully connected layers. The class estimation part 22 may include a plurality of fully connected layers connected in series. The class estimation part 22 converts the feature maps 32 using a fully connected layer, and outputs, for each class, information indicating whether an object of a corresponding class is shown, as class information. The class estimation part 22 may include, for example, one fully connected layer or a plurality of fully connected layers connected in series, for each class. In a case where objects of a plurality of classes are shown in the image 31, the class estimation part 22 can estimate that the object of each of these classes is shown.

The object number estimation part 23 outputs the number of one or more objects shown in the image 31 based on the feature maps 32 output from the feature extraction part 21. The class estimation part 22 includes one or more fully connected layers. The object number estimation part 23 may include a plurality of fully connected layers connected in series. The object number estimation part 23 converts the feature maps 32 using the fully connected layer and outputs the number of objects for each class.

Figure 4:
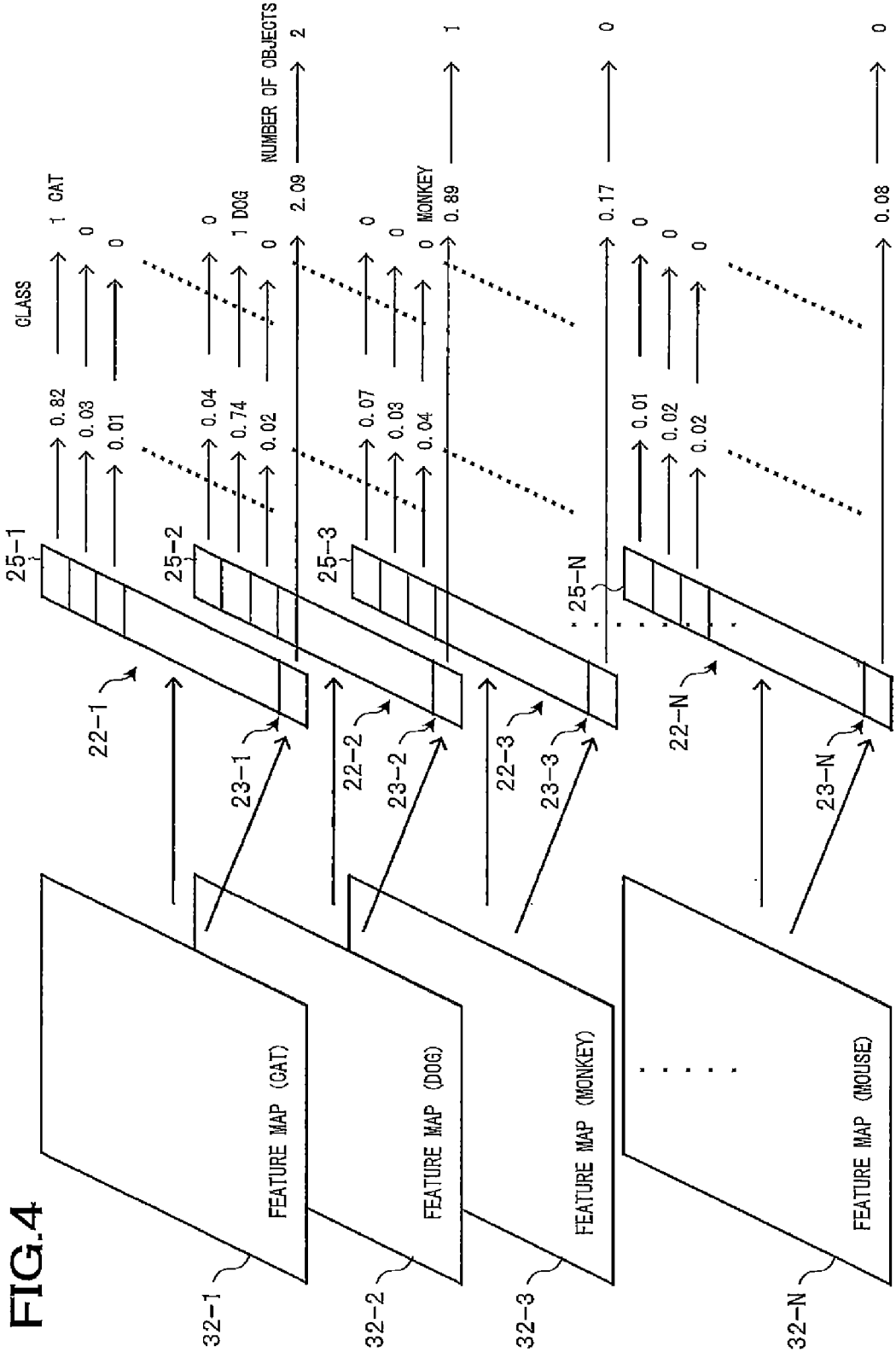
FIG. 4 is a diagram illustrating a configuration example of a class estimation part 22 and an object number estimation part 23.

FIG. 4 is a diagram illustrating a configuration example of the class estimation part 22 and the object number estimation part 23. The class estimation part 22 and the object number estimation part 23 may be composed of separate fully connected layers, or may be composed of a single fully connected layer. For example, as shown in FIG. 4, the class estimation part 22 and the object number estimation part 23 are composed of fully connected layers 25-1 to 25-N. N is the total number of classes that the model 2 can classify. As the feature maps 32, feature maps 32-1 to 32-N are input to the fully connected layers 25-1 to 25-N, respectively. The fully connected layers 25-1 to 25-N each have output units of N+1 channels. If an index of a certain class is i, in the fully connected layer 25-$i$, output units 22-$i$ of the N channels correspond to the class estimation part 22, and an output unit 23-$i$ of the one channel corresponds to the object number estimation part 23. The output units 22-$i$ output a probability value of each class estimated from the feature map 32-$i$ corresponding to the class i. In the classification stage after learning is completed, the probability value of each class is converted to 0 or 1. For example, a probability value equal to or greater than a predetermined value is converted to 1, and a probability value less than the predetermined value is converted to 0. The output of the probability value equal to or greater than the predetermined value for class i from the fully connected layer 25-$i$ indicates that an object of the class i is estimated to be shown in the image 31. The output unit 23-$i$ outputs the number of objects of the class i estimated from the feature map 32-$i$. In the classification stage after learning is completed, the number of objects is converted into an integer by rounding off or the like.

Figure 5:
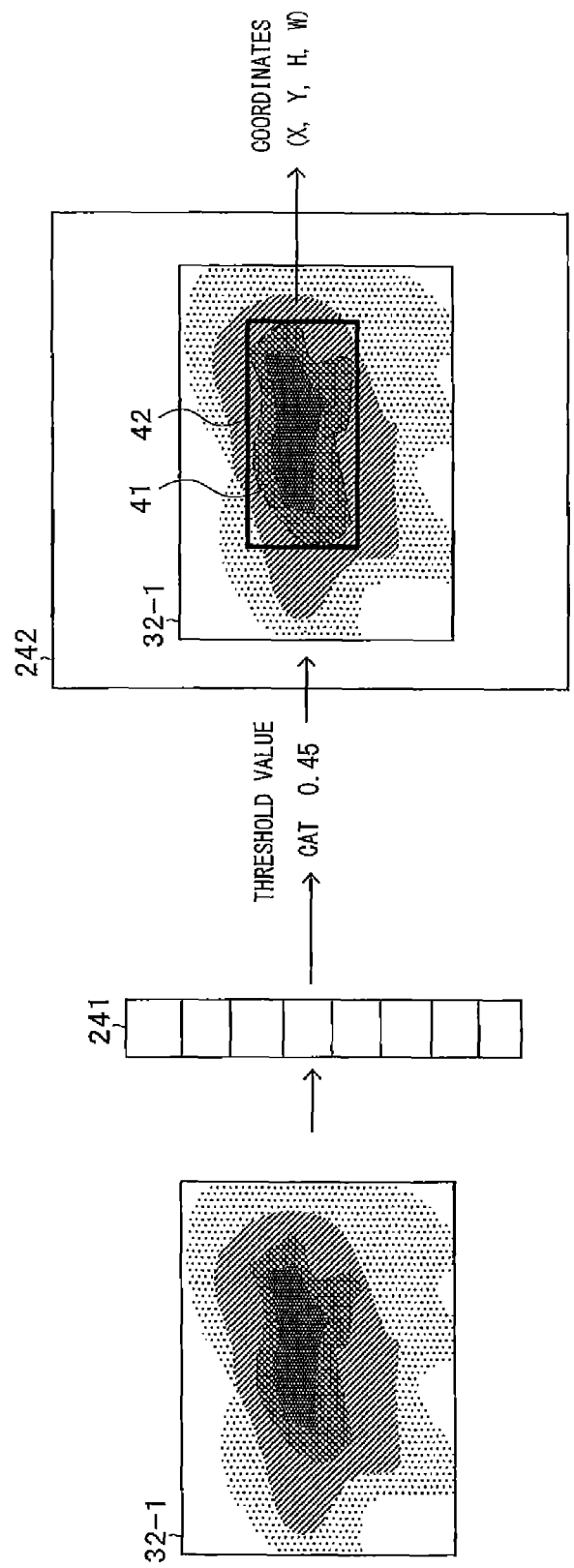
FIG. 5 is a diagram illustrating an example of an overview of functions of a threshold value estimation part 241 and a coordinate output part 242.

The coordinate estimation part 24 outputs coordinate data of each of one or more objects in the image 31. The coordinate estimation part 24 includes a threshold value estimation part 241 and a coordinate output part 242. FIG. 5 is a diagram illustrating an example of an overview of functions of the threshold value estimation part 241 and the coordinate output part 242. The threshold value estimation part 241 is composed of, for example, one or more fully connected layers. The threshold value estimation part 241 outputs a threshold value estimated to be a value of a boundary portion between a region where the object is present and a region where the object is not present in the feature map 32. Each array element constituting the feature map 32-$i$ stores a value indicating the probability that an object of the class i is present at the coordinates that the element corresponds to in the image 31. That is, the coordinate estimation part 24 outputs a threshold value for specifying a region having a high probability that an object of the class i is present by converting the feature map 32-$i$.

For example, as shown in FIG. 5, the threshold value estimation part 241 outputs a threshold value of the class 1 for the feature map 32-1 corresponding to class 1.

The coordinate output part 242 outputs, as the coordinate data of the object, coordinates corresponding to a region composed of elements having a value equal to or greater than the threshold value output from the threshold value estimation part 241, among a plurality of array elements constituting the feature map 32. The coordinate data may indicate a position and a range corresponding to this region. Specifically, the coordinate output part 242 specifies a region composed of elements having a value equal to or greater than the threshold value from the feature map 32-$i$, and sets a rectangular bounding box for the region. For example, the coordinate output part 242 sets a bounding box such that most of the region composed of elements having a value equal to or greater than the threshold value is surrounded by the bounding box. In a case where a plurality of regions are specified from the feature map 32-$i$, the coordinate output part 242 sets a bounding box for each region. The coordinate output part 242 outputs, as the coordinate data, the coordinates of the center of the bounding box, the height and width of the bounding box, and the class i, for example, for each region. The coordinate output part 242 may further output the number of specified regions as the number of objects of the class i. For example, as shown in FIG. 5, the coordinate output part 242 specifies a region 41 composed of elements having a value equal to or greater than the threshold value output from the threshold value estimation part 241 in the feature map 32-1, and sets a bounding box 42 corresponding to the region 41.

In order to generate the model 2 described above, the first training data acquisition unit 111 acquires, for each of a plurality of images 31 used for learning, first training data including the image 31, a label (ground truth) indicating the class of the object shown in the image 31, and a label indicating the number of objects, from the storage unit 14.

The label indicating the class may be expressed by vectors, for example. For example, in this label, 1 is set in a vector element corresponding to the class of the object shown in the image 31, and 0 is set in vector elements corresponding to the other classes. In a case where objects of a plurality of classes are shown in the image 31, 1 is set to a vector element corresponding to each of the plurality of classes. For example, the first training data acquisition unit 111 may convert the label of the class into the same format as the format of the probability value output from the class estimation part 22.

The label indicating the number of objects may also be expressed as vectors, for example. For example, in this label, the number of objects of the class is set in a vector element corresponding to the class of the object shown in the image 31, and 0 is set in vector elements corresponding to the other classes.

The first training unit 112 trains the feature extraction part 21, the class estimation part 22, and the object number estimation part 23 using the first training data acquired by the first training data acquisition unit 111. That is, the first training unit 112 causes the feature extraction part 21, the class estimation part 22, and the object number estimation part 23 to learn from the first training data. The processing by the first training unit 112 is automatically executed in response to the acquisition of the first training data by the first training data acquisition unit 111, for example. The first training unit 112 performs, as the feature extraction part 21, the class estimation part 22, and the object number estimation part 23, arithmetic processing corresponding to these layers, and outputs the probability and the number of objects of each class. The first training unit 112 performs learning by comparing the output information with the label.

Specifically, the first training unit 112 inputs the image 31 to the feature extraction part 21 and causes the feature extraction part 21 to output feature maps 32-1 to 32-N. The first training unit 112 inputs the feature maps 32-1 to 32-N to the class estimation part 22, and causes the class estimation part 22 to output the probability of each class. The first training unit 112 calculates classification errors by comparing the probabilities output from the class estimation part 22 with the label of the class. The first training unit 112 updates the weight and bias parameters held by the class estimation part 22 using the classification errors. Further, the first training unit 112 inputs the feature maps 32-1 to 32-N to the object number estimation part 23, and causes the object number estimation part 23 to output the number of objects of each class. The first training unit 112 calculates counting errors by comparing the numbers of objects output from the object number estimation part 23 with the label of the number of objects. The first training unit 112 updates the weight and bias held by the object number estimation part 23 using the counting errors.

In addition, the first training unit 112 performs back propagation of the classification errors from the class estimation part 22 to the feature extraction part 21 to train the feature extraction part 21 so that a region of the object of the class shown in the image 31 is highlighted in the feature map 32. Highlighting a region means that probability values stored in the region is higher than a probability values stored outside the region. Further, the first training unit 112 performs back propagation of the counting errors from the object number estimation part 23 to the feature extraction part 21 to train the feature extraction part 21 so that a number of regions corresponding to the number of objects of the label included in the first training data are highlighted in the feature map 32. As a result of the training, the feature extraction part 21 outputs a feature map in which a number of regions, which correspond to the number of objects of the label and are at positions corresponding to the positions where the objects are shown in the image, are highlighted.

FIG. 6 is a diagram illustrating an example of an image used for learning, and probability distributions in feature maps in a stage of learning and after completion of learning. For example, as shown in FIG. 6, objects 51 and 52 of the class 1 and an object 53 of a class 2 are shown in a certain image 31A. For the class 1, in a feature map 32-1-1 generated in a stage of learning, for example, one region is highlighted. From the feature map 32-1-1, it can be estimated that one or more object of the class 1 are shown in the image 31, but the number of the objects of the class 1 cannot be accurately estimated. As learning progresses, for example, one region is gradually divided into two regions. In a feature map 32-1-2 generated after the completion of learning, two regions are highlighted. For the class 2, in a feature map 32-2-1 generated in a stage of learning, for example, two regions are highlighted, in a feature map 32-2-2 generated after the completion of learning, one region is highlighted. Highlighting a number of regions corresponding to the number of objects of the label is realized by performing back propagation from the object number estimation part 23 to the feature extraction part 21. Further, causing the position of the region that will be highlighted to correspond to the position of the object in the image 31 is realized by performing back propagation of the classification errors.

The classification errors and the counting errors may be combined to be subjected to the back propagation. For example, the classification error is E1, the counting error is E2, and the predetermined ratio is k (0<k<1). In this case, a combination error E calculated by E=k*E1+(1−k)*E2 may be subjected to the back propagation.

For each of images 33 of which the number is smaller than the number of the plurality of images 31 that are acquired by the first training data acquisition unit 111 and used for the training of the feature extraction part 21, the class estimation part 22, and the object number estimation part 23 by the first training unit, the second training data acquisition unit 113 acquires second training data including the image 33 and a label indicating coordinates of each of one or more objects shown in the image 33, from the storage unit 14. The processing by the second training data acquisition unit 113 is automatically executed in response to the completion of the training by the first training unit 112, for example. The image 33 may be some of the images 31. The label of coordinates may include, for example, the coordinates of the center of the bounding box, the height and width of the bounding box, and the class of the object.

The second training unit 114 causes the feature extraction part 21 trained by the first training unit 112 to output the feature maps 32 of the image 33 included in the second training data acquired by the second training data acquisition unit 113. The processing by the second training unit 114 is automatically executed in response to the acquisition of the second training data by the second training data acquisition unit 113, for example. The second training unit 114 trains the coordinate estimation part 24 using the output feature maps 32 and the label of coordinates included in the second training data. The second training unit 114 performs arithmetic processing corresponding to the feature extraction part 21 and the coordinate estimation part 24. As a result of the training of the feature extraction part 21, the class estimation part 22, and the object number estimation part 23, the regions corresponding to the number of objects shown in the image 33 in the feature maps 32 are highlighted at positions corresponding to the objects. Therefore, since the coordinate estimation part 24 is caused to learn the coordinates of the object based on the highlighted region, the labels of coordinates for all the images 31 used for the training of the feature extraction part 21, the class estimation part 22, and the object number estimation part 23 are not necessary, and the labels of coordinates for some images 33 may be prepared. As an example, in a case where, for a model capable of identifying objects of 50 classes, the number of images 31 prepared for learning is about 100,000 and the number of images 33 for preparing coordinate data as labels is about 3,000, the coordinate estimation part 24 was able to be fully trained.

Figure 7:
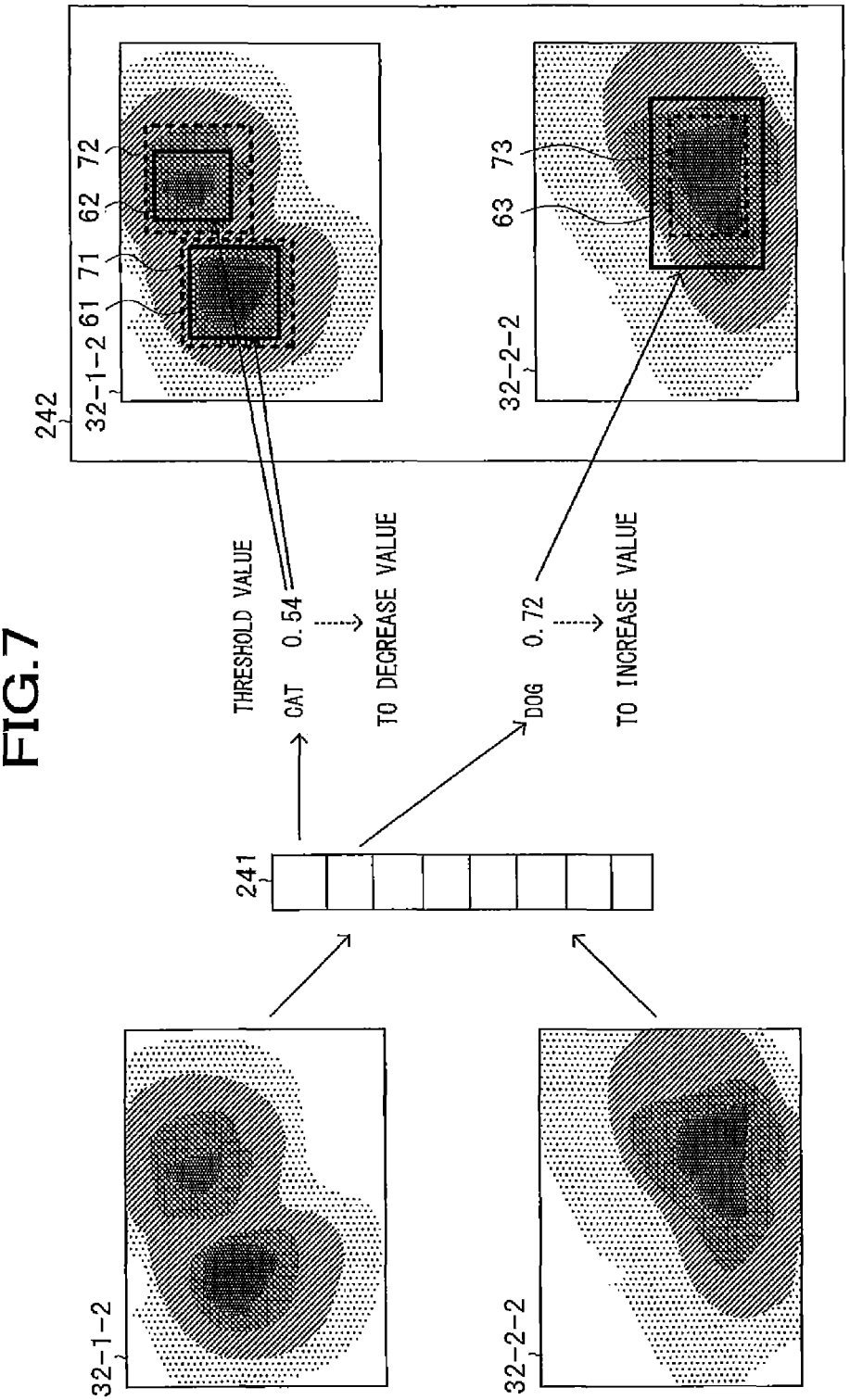
FIG. 7 is a diagram showing an example of a training outline of the threshold value estimation part 241 and the coordinate output part 242.

FIG. 7 is a diagram showing an example of a training outline of the threshold value estimation part 241 and the coordinate output part 242. Specifically, the feature extraction part 21 outputs the feature maps 32-1 to 32-N corresponding to classes 1 to N as in the case of the training by the first training unit 112. The second training unit 114 inputs the feature map corresponding to the class included in the label of coordinates, among the feature maps 324 to 32-N, to the threshold value estimation part 241, and causes the threshold value estimation part 241 to output a threshold value corresponding to the class. In the case of the image 31A shown in FIG. 6, the feature maps 32-1-2 and 32-2-2 are input to the threshold value estimation part 241 as shown in FIG. 7. The threshold value estimation part 241 outputs a threshold value for each of the classes 1 and 2.

The second training unit 114 inputs the feature map corresponding to the class included in the label and the threshold value output from the threshold value estimation part 241 to the coordinate output part 242. Then, the second training unit 114 causes the coordinate output part 242 to output coordinates corresponding to a region composed of elements having a value equal to or greater than the threshold value in the feature map. If the learning by the feature extraction part 21 has been completed, coordinates corresponding to the number of objects shown in the image 33 are usually output for each class of the objects shown in the image 33. The second training unit 114 calculates a coordinate error by comparing the coordinates output from the coordinate output part 242 with the label of the coordinates. The second training unit 114 calculates a correct threshold value using the coordinate error and the feature map 32. The second training unit 114 calculates a threshold value error by comparing the threshold value output from the threshold value estimation part 241 with the correct threshold value. Then, the second training unit 114 updates the weight and bias held by the threshold value estimation part 241 using the threshold value error. Since an appropriate threshold value may be different for each class, the second training unit 114 causes the threshold value estimation part 241 to learn the threshold value for each class. For example, in the case of the image 31A, as shown in FIG. 7, the coordinate output part 242 sets bounding boxes 61 and 62 corresponding to two regions for the class 1, and sets a bounding box 63 corresponding to one region for the class 2. Correct bounding boxes 71 and 72 of the class 1 set from the label of coordinates are wider than the bounding boxes 61 and 62. Therefore, the second training unit 114 trains the threshold value estimation part 241 to output a smaller threshold value. In addition, the correct bounding box 73 of the class 2 is narrower than the bounding box 63. Therefore, the second training unit 114 trains the threshold value estimation part 241 to output a larger threshold value.

When the model 2 is generated through the training of the feature extraction part 21, the class estimation part 22, and the object number estimation part 23 by the first training unit 112, and the training of the coordinate estimation part 24 by the second training unit 114, the model storage control unit 115 stores the generated model 2 in the storage unit 14.

[2-2. Class Classification]

The model reading unit 116 reads the model 2 stored in the storage unit 14 and loads the model into a RAM 14c or the GPU memory 19.

The feature map output control unit 117, the class output control unit 118, and the coordinate output control unit 119 perform arithmetic operations corresponding to the feature extraction part 21, the class estimation part 22, and the coordinate estimation part 24, respectively. The feature map output control unit 117 inputs a given image, in which one or more objects to be classified are shown, to the feature extraction part 21 included in the read model 2, and causes the feature extraction part 21 to output a feature maps of the given image. The given image may be stored in the storage unit 14, for example, or may be acquired via a network or a recording medium.

The class output control unit 118 inputs the feature map output from the feature extraction part 21 to the class estimation part 22 included in the read model 2, and causes the class estimation part 22 to output class information indicating each class of one or more objects shown in the given image.

The coordinate output control unit 119 inputs the feature maps output from the feature extraction part 21 to the coordinate estimation part 24 included in the read model 2, and causes the coordinate estimation part 24 to output coordinates of each of one or more objects shown in the given image. Here, it is sufficient that the coordinate output control unit 119 inputs, to the coordinate estimation part 24, only the feature map corresponding to each of one or more classes indicated in the class information output from the class estimation part 22 as the class of one or more objects shown in the given image, among the feature maps output from the feature extraction part 21. The coordinate estimation part 24 outputs a threshold value corresponding to each of one or more classes indicated in the class information. For each of one or more classes indicated in the class information, the coordinate output control unit 119 specifies a region in which an object of that class is shown and sets a bounding box by using the feature map and the threshold value. The coordinate output control unit 119 outputs the coordinate data of the bounding box and the corresponding class for each region. The coordinate output control unit 119 may further output the number of objects corresponding to the number of bounding boxes for each class. It is unnecessary to input the feature maps to the object number estimation part 23 and to output the number of objects.

[3. Operation of Image Processing Device]

Figure 8:
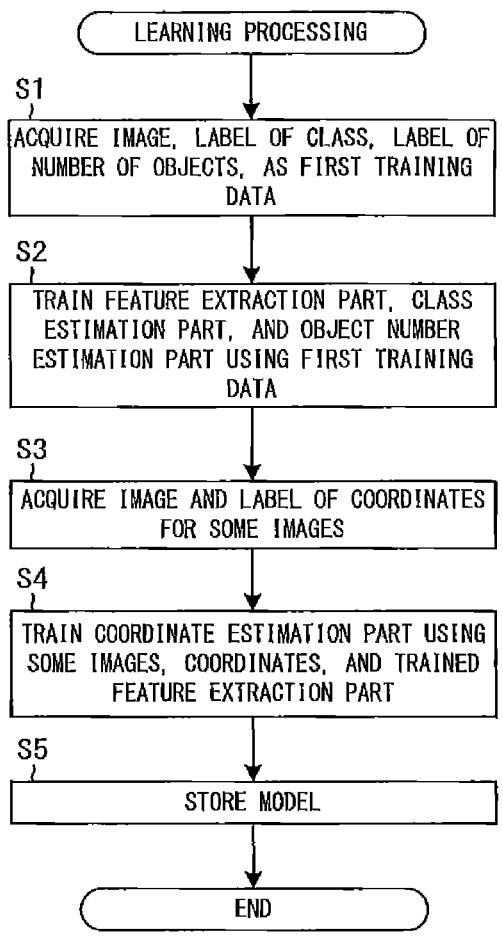
FIG. 8 is a flowchart showing an example of learning processing by the system controller 11 and the GPU 18 of the image processing device 1.

Next, the operation of the image processing device 1 will be described using FIGS. 8 and 9. FIG. 8 is a flowchart showing an example of learning processing by the system controller 11 and the GPU 18 of the image processing device 1. The system controller 11 and the GPU 18 perform learning processing according to the program codes included in the model generation program.

Figure 9:
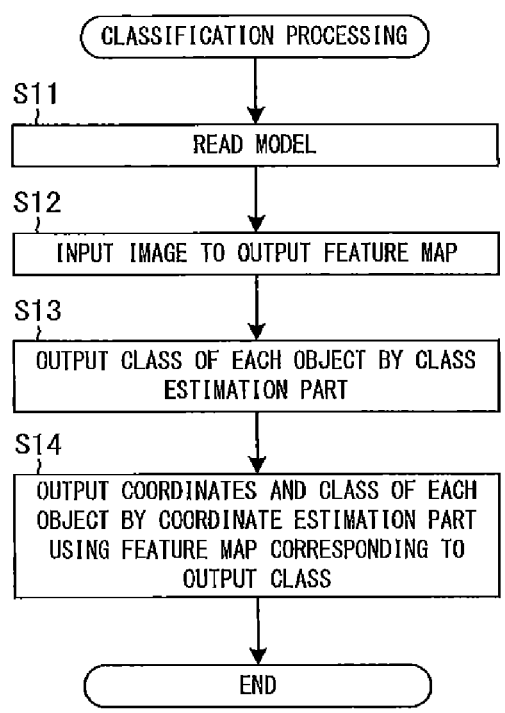
FIG. 9 is a flowchart showing an example of classification processing by the system controller 11 and the GPU 18 of the image processing device 1.

As shown in FIG. 9, the first training data acquisition unit 111 acquires the image 31 and the labels of the class and the number of objects corresponding to the image 31 from the storage unit 14, as the first training data, for each of the plurality of images 31 (step S1).

Next, the first training unit 112 trains the feature extraction part 21 to the object number estimation part 23 using the first training data (step S2). Specifically, the first training unit 112 causes the feature extraction part 21 to output the feature maps 32-1 to 32-N for each image 31. The first training unit 112 inputs the feature maps 32-1 to 32-N to the class estimation part 22, and causes the class estimation part 22 to output class information. The first training unit 112 calculates classification errors by comparing the class information with the label of the class. The first training unit 112 updates the parameters of the class estimation part 22 based on the classification errors. In addition, the first training unit 112 inputs the feature maps 32-1 to 32-N to the object number estimation part 23, and causes the object number estimation part 23 to output the number of objects for each class. The first training unit 112 calculates counting errors by comparing the output number of objects with the label of the number of objects. The first training unit 112 updates the parameters of the object number estimation part 23 based on the counting errors. Further, the first training unit 112 back-propagates the errors from the class estimation part 22 and the object number estimation part 23 to the feature extraction part 21, and updates the parameters of the feature extraction part 21. The first training unit 112 ends the training when, for example, the number of epochs reaches a predetermined number or the like.

Next, the second training data acquisition unit 113 acquires the image 33 and the label of the coordinates corresponding to the image 33 from the storage unit 14, as the second training data, for some images 33 among the images 31 (step S3).

Next, the second training unit 114 trains the coordinate estimation part 24 using the second training data (step S4). Specifically, the second training unit 114 causes the feature extraction part 21 to output the feature maps 32-1 to 32-N corresponding to each image 33. The second training unit 114 inputs the feature map(s) corresponding to the class(es) included in the label of coordinates, among the feature maps 32-1 to 32-N, to the threshold value estimation part 241, and causes the threshold value estimation part 241 to output a threshold value(s) of the class(es). The second training unit 114 inputs the threshold value(s) to the coordinate output part 242. The coordinate output part 242 specifies one or more regions composed of array elements having values equal to or greater than the threshold value, from the feature map, for each class included in the label of the coordinates. The coordinate output part 242 outputs the class and the coordinate data of the bounding box corresponding to the region, for each specified region. The second training unit 114 calculates a coordinate error by comparing the output coordinate data with the label of the coordinates. The second training unit 114 calculates a threshold value error based on the coordinate error and the feature map. The second training unit 114 updates the parameters of the threshold value estimation part 241 based on the threshold value error. The second training unit 114 ends the training when, for example, the number of epochs reaches a predetermined number or the like. As a result, the model 2 is generated. The model storage control unit 115 stores the generated model 2 in the storage unit 14 (step S5), and ends the learning processing.

FIG. 9 is a flowchart showing an example of classification processing by the system controller 11 and the GPU 18 of the image processing device 1. The system controller 11 and the GPU 18 perform classification processing according to the program codes included in the classification program.

As illustrated in FIG. 9, the model reading unit 116 reads the model 2 from the storage unit 14 (step S11). Next, the feature map output control unit 117 acquires an image to be classified. The feature map output control unit 117 inputs the acquired image to the feature extraction part 21, and causes the feature extraction part 21 to output feature maps (step S12).

Next, the class output control unit 118 inputs the output feature maps to the class estimation part 22, and causes the class estimation part 22 to output class information (step S13).

Next, the coordinate output control unit 119 inputs, to the coordinate estimation part 24, the feature map corresponding to each class of the object shown in the image, indicated by the class information, among the output feature maps. As a result, the coordinate output control unit 119 causes the coordinate estimation part 24 to output the coordinates and the class of each object as the estimation result (step S14). When step S14 is ended, the system controller 11 ends the classification processing.

As described above, according to the present embodiment, the image processing device 1 generates the model 2 including the feature extraction part 21 which includes a plurality of convolution layers and outputs a feature map of an image in which one or more objects are shown, the class estimation part 22 that outputs class information indicating the class of one or more objects based on the feature map, the object number estimation part 23 that outputs the number of one or more objects based on the feature map, and the coordinate estimation part 24 that outputs the coordinates of each of one or more objects in the image based on the feature map. Here, tier each of a plurality of images in each of which one or more objects are shown, the image processing device 1 acquires first training data including the image 31, the class of each of one or more objects, and the number of objects, from the storage unit 14. Further, the image processing device 1 trains the feature extraction part 21, the class estimation part 22, and the object number estimation part 23 using the first training data. Further, for each of the images of which the number is smaller than the number of the plurality of images, the image processing device 1 acquires second training data including the image and the coordinates of each of one or more objects in the image, from the storage unit 14. Further, the image processing device 1 causes the trained feature extraction part 21 to output a feature map of the image included in the second training data, and trains the coordinate estimation part 24 using the feature map and the coordinates included in the second training data. Then, the image processing device 1 stores the generated model 2 in the storage unit 14. Therefore, even if only a relatively small amount of coordinate data is used for learning, it is possible to improve an accuracy of estimating the coordinates of a plurality of objects in the image.

In addition, the coordinate estimation part 24 may include the fully connected layer that outputs a threshold value estimated to be a value of a boundary portion between a region where the object is present and a region where the object is not present in the feature map, and the coordinate output part that outputs coordinates corresponding to a region composed of elements having a value equal to or greater than the output threshold value, among a plurality of elements constituting the feature map, as the coordinates of the object. The image processing device 1 may cause the fully connected layer included in the coordinate estimation part 24 to learn the threshold value. In this case, the fully connected layer included in the coordinate estimation part 24 learns a threshold value for specifying the periphery of the region where the object is present, from the feature map indicating the distribution of the probability that the object to be classified is present. Therefore, it is possible to appropriately estimate the coordinates of the object.

In addition, the image processing device 1 may train the feature extraction part 21 by back-propagating the error from the object number estimation part 23 to the feature extraction part 21 such that a number of regions, where the object is present, corresponding to the number of objects included in the first training data are highlighted in the feature map. In this case, based on the error between the number of objects output from the object number estimation part 23 and the number of objects included in the first training data, the error from the object number estimation part 23 is back-propagated to the feature extraction part 21, the parameter of the convolution layer included in the feature extraction part 21 is updated. Therefore, as a result of this training, the feature extraction part 21 outputs a feature map in which a number of regions corresponding to the number of objects included in the first training data are highlighted. Therefore, it is possible to accurately estimate the coordinates of each of one or more objects shown in the image.

In addition, the object number estimation part 23 may output the number of objects for each class. In addition, the feature extraction part 21 may output a feature map for each class. Further, the image processing device 1 may train the coordinate estimation part 24 using the feature map corresponding to each of one or more classes included in the first training data, among the feature maps output from the feature extraction part 21 trained using the first training data.

In this case, as a result of the training using the first training data, the feature extraction part 21 outputs a feature map in which an appropriate number of regions are highlighted for each of one or more classes included in the first training data. By using this feature map, it is possible to train the coordinate estimation part 24 so that the coordinates of an appropriate number of objects are output for each class.

Further, the object number estimation part 23 may include the fully connected layer that outputs the number of one or more objects.

In addition, the image processing device 1 may read the generated model 2 from the storage unit 14. In addition, the image processing device 1 may cause the feature extraction part 21 included in the read model 2 to output a feature map of a given image in which one or more objects are shown. In addition, the image processing device 1 may input the output feature map of the given image to the class estimation part 22 included in the read model 2, and output the class information indicating class information indicating the class of each of one or more objects shown in the given image. Further, the image processing device 1 may input the output feature map of the given image to the coordinate estimation part 24 included in the read model 2, and output the coordinates of each of one or more objects shown in the given image. In this case, even if only a relatively small amount of coordinate data is used for learning, it is possible to improve an accuracy of estimating the coordinates of a plurality of objects in the image.

REFERENCE SIGNS LIST

1 image processing device
11 system controller
12 system bus
13 input/output interface
14 storage unit
15 communication unit
16 input unit
17 display unit
18 GPU
19 GPU memory
111 first training data acquisition unit
112 first training unit
113 second training data acquisition unit
114 second training unit
115 model storage control unit
116 model reading unit
117 feature map output control unit
118 class output control unit
119 coordinate output control unit
2 model
21 feature extraction part
22 class estimation part
23 object number estimation part
24 coordinate estimation part
241 threshold value estimation part
242 coordinate output part

The invention claimed is:

1. An information processing apparatus, comprising:
   circuitry configured to
   generate a model; the model including computer-executable instructions, which when executed by the circuitry causes the circuitry to perform
   feature extraction, wherein the feature extraction includes a plurality of convolution layers and outputs at least one feature map of an image in which one or more objects are shown, class estimation, wherein the class estimation is configured to output class information indicating a class of each of the one or more objects based on the at least one feature map, object number estimation, wherein the object number estimation outputs a number of the one or more objects based on the at least one feature map, and coordinate estimation, wherein the coordinate estimation is configured to output coordinates of each of the one or more objects in the image based on the at least one feature map; and a computer-readable medium configured to store the model, wherein the circuitry is configured to acquire, for each of a plurality of first images, first training data including a first image, a class of each of one or more first objects shown in the first image, and a number of the one or more first objects, from the computer-readable medium, train the feature extraction, the class estimation, and the object number estimation based on the acquired first training data, acquire, for each of a plurality of second images, second training data including a second image, and coordinates of each of one or more second objects shown in the second image, from the computer-readable medium, a number of the second images being smaller than a number of the plurality of first images, and cause the feature extraction trained based on the first training data to output at least one feature map of the second image for each of the second images included in the acquired second training data, and train the coordinate estimation based on the output feature maps of the second images and the coordinates included in the acquired second training data.

2. The information processing apparatus of claim 1, wherein the coordinate estimation includes a fully connected layer, wherein the fully connected layer outputs a threshold value estimated to be a value of a boundary between a region where the object is present and a region where the object is not present in the at least one feature map, and the circuitry is further configured to output coordinates corresponding to a region composed of elements each having a value equal to or greater than the output threshold value, among a plurality of elements constituting the at least one feature map, as coordinates of the object, and cause the fully connected layer included in the coordinate estimation to learn to determine the threshold value.

3. The information processing apparatus of claim 1, wherein the circuitry is further configured to train the feature extraction by back-propagating errors from the object number estimation the feature extraction so that a number of regions corresponding to the number of the objects included in the first training data are highlighted in the at least one feature map.

4. The information processing apparatus of claim 1, wherein the circuitry is further configured to output, by the object number estimation, the number of the objects for each class, output, by the feature extraction, a feature map for each class, and train the coordinate estimation using the feature map corresponding to each of the one or more classes included in the acquired first training data, among feature maps output from the feature extraction.

5. The information processing apparatus of claim 1, wherein the object number estimation further includes a fully connected layer, wherein the fully connected layer is configured to output the number of the one or more objects.

6. An information processing apparatus, comprising:
circuitry configured to
read the model generated according to claim 1; and
execute the model to
output at least one feature map of a given image in which one or more objects are shown;
input the at least one output feature map of the given image to the class estimation included in the model, and output class information indicating a class of each of the one or more objects shown in the given image; and
input the at least one output feature map of the given image to the coordinate estimation included in the model, and output coordinates of each of the one or more objects shown in the given image.

7. A learning method executed by a computer, the method comprising:
generating a model, the model including
feature extraction, wherein the feature extraction includes a plurality of convolution layers and outputs at least one feature map of an image in which one or more objects are shown,
class estimation, wherein the class estimation is configured to output class information indicating a class of each of the one or more objects based on the at least one feature map,
object number estimation, wherein the object number estimation is configured to output a number of the one or more objects based on the at least one feature map, and
coordinate estimation, wherein the coordinate estimation is configured to output coordinates of each of the one or more objects in the image based on the at least one feature map; and
storing the model in a computer-readable medium, wherein generating the model includes
acquiring, for each of a plurality of first images, first training data including a first image, a class of each of one or more first objects shown in the first image, and a number of the one or more first objects, from the computer-readable medium,
training the feature extraction, the class estimation, and the object number estimation based on the acquired first training data,
acquiring, for each of a plurality of second images, second training data including a second image, and coordinates of each of one or more second objects shown in the image, from the computer-readable medium, a number of the second images being smaller than a number of the plurality of first images, and
causing the feature extraction trained based on the first training data to output at least one feature map of the second image for each of the second images included in the acquired second training data, and training the coordinate estimation based on the output feature maps of the second images and the coordinates included in the acquired second training data.

8. The learning method of claim 7, wherein the coordinate estimation includes a fully connected layer, wherein the fully connected layer outputs a threshold value estimated to be a value of a boundary between a region where the object is present and a region where the object is not present in the at least one feature map, further comprising:
 outputting coordinates corresponding to a region composed of elements each having a value equal to or greater than the output threshold value, among a plurality of elements constituting the at least one feature map, as coordinates of the object; and
 causing the fully connected layer included in the coordinate estimation to learn to determine the threshold value.

9. The learning method of claim 7, further comprising:
 training the feature extraction by back-propagating errors from the object number estimation to the feature extraction so that a number of regions corresponding to the number of the objects included in the first training data are highlighted in the at least one feature map.

10. The learning method of claim 7, further comprising:
 outputting, by the object number estimation, the nur ber of the objects for each class;
 outputting, by the feature extraction, a feature map for each class; and
 training the coordinate estimation using the feature map corresponding to each of the one or more classes included in the acquired first training data, among feature maps output from the feature extraction.

11. The learning method of claim 7, wherein the object number estimation further includes a fully connected layer, wherein the fully connected layer outputs the number of the one or more objects.

12. A classification method executed by a computer, the method comprising:
 reading the model generated according to the method of claim 7;
 causing the feature extraction included in the model to output at least one feature map of a given image in which one or more objects are shown;
 inputting the at least one output feature map of the given image to the class estimation included in the model, and causing the class estimation to output class information indicating a class of each of the one or more objects shown in the given image; and
 inputting the at least one output feature map of the given image to the coordinate estimation included in the model and causing the coordinate estimation to output coordinates of each of the one or more objects shown in the given image.

13. A non-transitory computer-readable storage medium storing computer-readable instructions thereon which, when executed by a computer, causes the computer to perform a method, the method comprising:
 generating a model, wherein the model includes
  feature extraction, Therein the features extraction includes a plurality of convolution layers and outputs at least one feature map of an image in which one or more objects are shown,
  class estimation, wherein the class estimation is configured to output class information indicating a class of each of the one or more objects based on the at least one feature map,
  object number estimation, wherein the object number estimation is configured to output a number of the one or more objects based on the at least one feature map, and
  coordinate estimation, wherein the coordinate estimation is configured to output coordinates of each of the one or more objects in the image based on the at least one feature map; and
 storing the model in a computer-readable medium, wherein generating the model includes
  acquiring, for each of a plurality of first images, first training data including a first image, a class of each of one or more first objects shown in the first image, and a number of the one or more first objects, from the computer-readable medium,
  training the feature extraction, the class estimation, and the object number estimation based on the acquired first training data,
  acquiring, for each of a plurality of second images, second training data including a second image, and coordinates of each of one or more second objects shown in the second image, from the computer-readable medium, a number of the second images being smaller than a number of the plurality of first images, and
  causing the feature extraction trained by based on the first training data to output at least one feature map of the second image for each of the second images included ifs the acquired second training data, and training the coordinate estimation using the output feature maps of the second images and the coordinates included in the acquired second training data.

14. The non-transitory computer-readable medium of claim 13, wherein the coordinate estimation includes a fully connected layer, wherein the fully connected layer outputs a threshold value estimated to be a value of a boundary between a region where the object is present and a region where the object is not present in the at least one feature map, further comprising:
 outputting coordinates corresponding to a region composed of elements each having a value equal to or greater than the output threshold value, among a plurality of elements constituting the at least one feature map, as coordinates of the object; and
 causing the fully connected layer included in the coordinate estimation to learn to determine the threshold value.

15. The non-transitory computer-readable medium of claim 13, further comprising:
 training the feature extraction by back-propagating errors from the object number estimation to the feature extraction so that a number of regions corresponding to the number of the objects included in the first training data are highlighted in the at least one feature map.

16. The non-transitory computer-readable medium of claim 13, further comprising:
 outputting, by the object number estimation, the number of the objects for each class;
 outputting, by the feature extraction, a feature map for each class; and
 training the coordinate estimation using the feature map corresponding to each of the one or more classes included in the acquired first training data, among feature maps output from the feature extraction.

17. The non-transitory computer-readable medium of claim 13, wherein the object number estimation further includes a fully connected layer, wherein the fully connected layer outputs the number of the one or more objects.

18. A non-transitory computer-readable storage medium storing computer-readable instructions thereon which, when executed by a computer, cause the computer to perform a method, the method comprising:

reading the model generated according to claim 13;

causing the feature extraction included in the model to output at least one feature map of a given image in which one or more objects are shown;

inputting the at least one output feature map of the given image to the class estimation included in the model, and outputting class information indicating a class of each of the one or more objects shown in the given image; and inputting the at least one output feature map of the given image to the coordinate estimation included in the model and outputting coordinates of each of the one or more objects shown in the given image.

* * * * *